United States Patent [19]
Akgulian et al.

[11] 3,905,180
[45] Sept. 16, 1975

[54] TORSION SPRING COUNTERBALANCE FOR A LAWN MOWER

[75] Inventors: Sahag C. Akgulian, Racine; Donald G. Haffner, Glendale; Dean A. Meyer, Caledonia, all of Wis.

[73] Assignee: Jacobsen Manufacturing Company, Racine, Wis.

[22] Filed: Sept. 12, 1974

[21] Appl. No.: 505,266

[52] U.S. Cl. ........................................ 56/7; 56/15.8
[51] Int. Cl.² ........................................ A01D 75/30
[58] Field of Search ........... 56/7, 6, 15.8, 15.9, 14.7

[56] References Cited
UNITED STATES PATENTS
1,957,079   5/1934   Ronning .................................. 56/7
3,514,926   6/1970   Heth et al. .............................. 56/7

*Primary Examiner*—J. N. Eskovitz
*Attorney, Agent, or Firm*—Arthur J. Hansmann

[57] ABSTRACT

A torsion spring counterbalance for a lawn mower pivotally supported on a tractor for raising and lowering the lawn mower, and for permitting the mower to pivot about its longitudinal axis to adjust to the elevation of the ground. The mower is mounted on the tractor with two mating pieces, and a torsion spring has its opposite ends connected to respective ones of the two pieces for counterbalancing any overweight on one end of the mower, such as a hydraulic motor on the mower. A clamp is adjustably engaged with one end of the torsion spring for adjusting the torsional force in the spring and thereby adjusting the counterbalancing force exertable by the spring on the mower.

4 Claims, 4 Drawing Figures

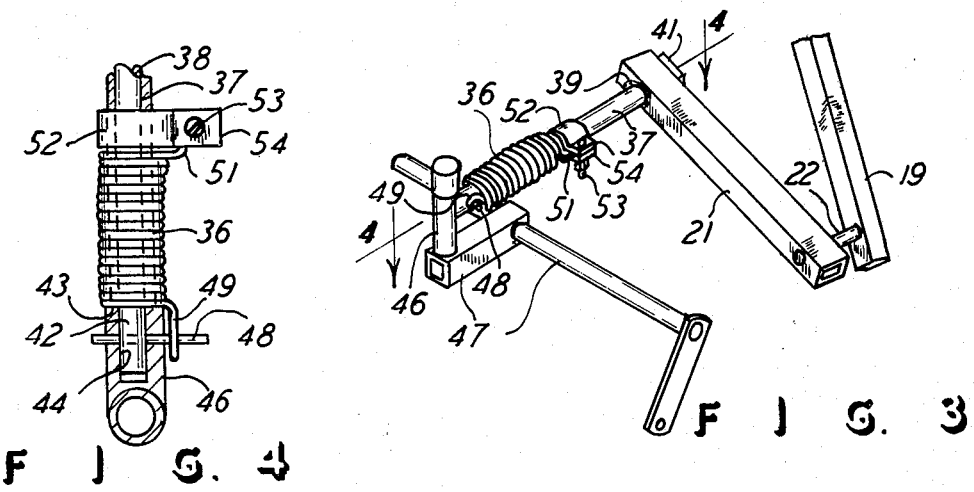
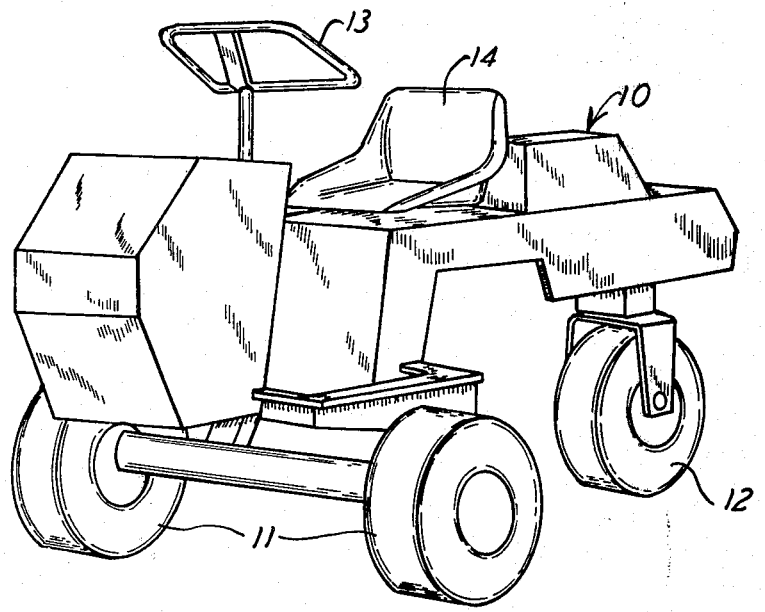
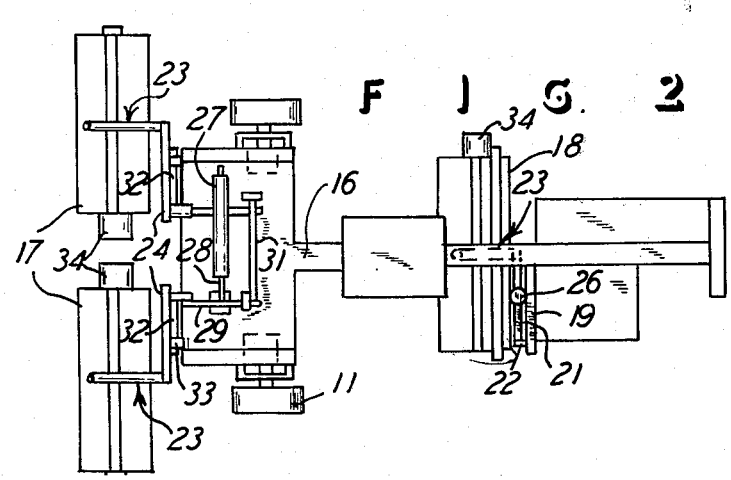

TORSION SPRING COUNTERBALANCE FOR A LAWN MOWER

This invention relates to a torsion spring counterbalance for a lawn mower, and, more particularly, it pertains to the pivotal mounting of the lawn mower on a tractor, wherein the mower may have an overbalance in weight to one end, and the torsion spring serves to overcome the overweighted end of the mower.

BACKGROUND OF THE INVENTION

The prior art is already fairly well developed with regard to pivotal mountings of lawn mowers on tractors. Further, the prior art already has counterbalance springs for overcoming the unbalance of the lawn mower in an end-to-end balance condition of the mower. That is, a lawn mower on a tractor may have a driving mechanism on one end of the mower, such as a hydraulic motor, sprocket and chain, or the like, and the mower may be attached to the tractor such that the mower can pivot about its central longitudinal axis, for adjusting to various ground elevations, but the drive mechanism on one end of the mower tends to overweight the mower to that end. Accordingly, the prior art utilizes springs for counterbalancing the overweight at one end of the mower, and U.S. Pat. No. 3,514,926 shows one arrangement for counterbalancing the overweighted mower. Further, the said patent shows an arrangement for adjusting the spring tension, and thereby adjusting the couterbalance force, but to do so only in various degrees rather than in smaller increments of adjustment. Also, the prior art is aware of the use of torsion springs, rather than compression or tension springs, in the balancing of lawn mowers on tractors, and U.S. Pat. No. 1,957,079 shows the use of a torsion spring which is used for countering the weight of the mower generally, rather than countering the overweight of one end of the mower as in the present invention.

However, the prior art does not disclose a pivotal mounting for a mower and with a torsion spring counterbalance arrangement which is counterbalancing an overweighted end of the mower wherein the mower is mounted for end-to-end up and down movement and with the torsion spring being disposed in a compact arrangement with the attachment pieces extending between the tractor and the mower. Accordingly, it is an object of this invention to achieve the aforementioned advantages and to thereby overcome the shortcomings of the prior art, as mentioned. In doing so, the present invention provides a torsion spring counterbalance for a lawn mower which is overweighted at one end and is pivotally connected to the tractor, and the arrangement is such that the spring is totally effective and is compact in the overall mounting arrangement.

Another object of this invention is to provide a counterbalance torsion spring for a pivotally mounted lawn mower and wherein the spring is readily and easily adjusted so that the operator can quickly see the degree of unbalance or see when the mower is level or balanced and he can quickly make the spring adjustment to achieve the level or balance position of the mower, as desired. Further, in accomplishing this, the connection of the torsion spring, including its adjustment connection, is effected in a convenient and inexpensive and uncomplicated arrangement, and only a minimum number of parts need be added to the mower, specifically the spring and a clamp, compared to several parts utilized in the prior art arrangements. Still further, the several parts of the prior art arrangements inherently project above the mower and the attachment members themselves, and thus those parts of the prior art are adding bulk and weight and additional interference in the overall arrangement and use of the mower.

Still further, the present invention provides a torsion spring counterbalance for a pivotally mounted lawn mower wherein the spring can be adjusted in accurate and refined increments of adjustment so that a complete range of spring force can be achieved within the overall strength of the spring. That is, the prior art arrangements are such that where any adjustment is at all possible, the adjustment must be made in sufficient degrees or steps, rather than in all degrees of adjustment as in the present invention, and thus the prior adjustments can be such that two adjacent adjustments may present only an under adjusted position or an over adjusted position, rather than the precise required adjusted position which is possible in the present invention.

Other objects and advantages have become apparent upon reading the following description in light of the accompanying drawings.

BRIEF DESCRIPTION OF THE DRAWINGS

FIG. 1 is a front perspective view of a tractor useful in supporting and conveying the mowers utilized in this invention.

FIG. 2 is a diagrammatic top plan view of the tractor in FIG. 1 and with three mowers shown attached thereto.

FIG. 3 is an enlarged front perspective view of a fragment of the mounting for the rear mower shown in FIG. 2.

FIG. 4 is an enlarged sectional view taken along the line 4—4 of FIG. 3.

DETAILED DESCRIPTION OF THE PREFERRED EMBODIMENT

The drawings show a tractor, generally designated 10, and having two front wheels 11 and a rear wheel 12 and a steering wheel 13 and an operator's seat 14. It will of course be understood by one skilled in the art that the tractor may be of any conventional configuration and arrangement suitable for supporting lawn mowers pivotally mounted to the tractor, as hereinafter described. FIG. 2 shows the tractor frame designated 16 and it shows two front mowers 17 and one rear mower 18, and it will be understood that the three mowers shown are pivotally attached to the tractor 10, and such arrangement may be as shown in U.S. Pat. No. 3,514,926 and as shown in U.S. Pat. No. 3,511,034 in the first embodiment shown therein. That is, the tractor 10 may have a frame piece 19 which pivotally supports an arm 21 on a pivot mounting 22, and the arm 21 presents the lawn mower attaching end at 23, so that the mower 18 may be attached and supported as shown in FIGS. 3 and 4 and in the said patents. Likewise, the front mowers 17 are suitably supported on pivot mountings or arms 24 suitably pivotally supported on the tractor 10, and the arms 24 also terminate in the mower connection ends 23, as shown in FIGS. 3 and 4. The construction for pivotally supporting the mowers 17 and 18 is substantially conventional and is such that the mowers may be raised and lowered, between transport and mowing positions relative to the ground, and the mowers may also pivot about the longitudinal axis of the connecting ends designated 23, as shown and described in the said patents and as hereinafter described. To this end, FIG. 2 also shows that the rear mower 18 is under the control of a cylinder assembly 26 which is shown in an upright position and which would be connected at its upper end to the frame arm 19 while the lower end of the assembly 26 is connected to the mower pivot arm 21, and the arrangement is achieved in any manner which will cause the arm 21 to pivot up and down about its pivot axis 22 in response to extension and contraction of the vertically disposed cylinder assembly 26, all in a conventional arrangement. The front mowers 17 are under the influence of a cylinder assembly 27 which is mounted on the tractor frame 16 and has its rod 28 engaging a linkage 29 and 31 which in turn engages a mower control arm 32 extending underneath a cam 33 affixed to the mower pivot arm 24, in a conventional arrangement and as shown in the said patents. It will therefore be understood that extension and contraction of the cylinder assembly 27 will actuate the linkage 29 and 31 to correspondingly move the cam plates 32 and engage the cams 33 for raising and lowering the mower 17 between the transport and mowing positions. Further, FIG. 2 shows that the mowers have drive mechanisms, such as the indicated hydraulic motors 34 which are attached respectively at one end of each of the mowers. Accordingly, the mowers are overbalanced in weight at the ends where the motors 34 are located, and it is this overbalance that is of concern in the present invention, and again the arrangement of the drive mechanism or motors is as shown in the said patents.

In order to counterbalance the overweighted end of the mowers 17 and 18, FIGS. 3 and 4 show the utilization of a torsion spring 36 which achieves the counterbalancing in a compact and efficient manner and thereby in an improved manner relative to the prior art.

FIGS. 3 and 4 show the mower is pivotally attached to the tractor by means of two mating pieces 37 and 38, and the piece 37 is an outer or sleeve piece which is affixed to the pivot arm 21 by means of welding at 39. Thus the piece 37, through the controlled pivot position of the arm 21, is positionable relative to the tractor itself. That is, any pivot of the arm 21, being relative to the tractor 10, will likewise determine the pivot position of the sleeve 37. However, the inner mating piece 38 is a shaft and extends through the length of the outer sleeve 37 and is free to rotate about its longitudinal axis relative to the sleeve 37 and thus relative to the arm 21 and the tractor 10. The rear end of the sleeve 38, such as through a plate 41, is axially fixed relative to the arm 21 and thus cannot move out of the sleeve 37 once the assembly is made as hereinafter described. The forwardly extending end 42 of the rod 38 extends beyond the forward edge 43 of the sleeve 37, as seen in FIG. 4. The extending end 42 projects into a socket 44 in an upstanding sleeve 46 which is affixed to the mower yoke pieces 47, as shown and as in the said patents. The shaft 38 and the piece 46 are held rotationally and longitudinally as a unit by means of a pin 48 which passes therethrough, as shown in FIG. 4. With the arrangement described, it will be therefore understood that the mowers 17 and 18 can move up and down in their respective ends and they would thereby be pivoting about the longitudinal axis of the two mating pieces 37 and 38, and in the course of mowing, this would predominately mean that the shaft 38 is rotating in the sleeve 37 as the opposite ends of the mower move up and down. Of course FIG. 3 is showing basically the arrangement for the rear mower 18, but the same general arrangement would pertain for the front mowers 17 relative to the mating members 37 and 38 and the torsion spring 36 and the mower yokes 47, all as being described herein.

To counterbalance any excessive or extra weight at one end of any mower 17 or 18, the torsion spring 36 has its opposite ends 49 and 51 connected to respective ones of the two nested mating pieces 37 and 38. Thus, the spring end 49 anchors with and connects to the extending end of the pin 48, and the spring end 51 is held by a tube clamp 52 which encircles the sleeve 37 and which is adjustably secured thereto. Thus a bolt 53 extends through the clamp ends 54 for securing the clamp 52 to the sleeve 37 and thus securing the spring end 51 relative to the sleeve 37.

With the arrangement described, it will be seen and understood that the torsion spring 36 is coiled in a direction such that it can exert a force on the pin 48 and thus influence the pivotal position of the mower in its end-to-end elevation. Further, the clamp 52 can be readily adjusted in its rotated position on the sleeve 37, and the bolt 53 can be loosened for rotating the clamp 52 and thereby moving the spring end 51 relative to the spring end 49 and thus alter the torsional force in the torsion spring 36 and thereby alter the amount of counterbalance force the spring 36 can exert on the particular mower. The arrangement is such that the torsion spring 36 occupies a negligible additional amount of space since it is concentric with and snugly disposed on the sleeve 37, and the operator can readily see the adjusted position of the clamp 52 for counterbalancing the mower, as desired. Thus, the two pieces 37 and 38 are mated in a concentric assembly, and the spring 36 is also concentric with the longitudinal axis which is common to the pieces 37 and 38.

What is claimed is:

1. In a lawn mower mounting on a tractor, a lawn mower, a pivot mounting for pivotally attaching said lawn mower to said tractor and including two mating pieces axially extending in the fore-and-aft direction of said tractor, with one of said pieces being oriented relative to said tractor and the other of said pieces being rotatable about its longitudinal axis relative to said tractor, said other of said pieces being affixed to said lawn mower for unitary pivotal action of said mower and said other of said pieces, a drive mechanism on one end of said lawn mower offset from the plane of the longitudinal axis of said mating pieces and overbalancing said lawn mower toward its said one end, a spring operatively connected between said tractor and said lawn mower for countering the over-balance of said lawn mower, the improvement comprising said spring being a torsion spring concentric on said two mating pieces and extending therealong, said other of said two mating pieces axially extending beyond said one of said mating pieces and with said torsion spring having its opposite ends respectively anchored to said two pieces, and with said torsion spring being coiled in the direction to exert a spring force on said other of said two pieces and thereby on said lawn mower to counterbalance the weight of said drive mechanism.

2. The lawn mower mounting as claimed in claim 1, including a removable connector on one of said two pieces for presenting the anchor connection for said torsion spring, and said connector being movable relative to said two pieces for adjusting the torsional force in said torsion spring and thereby adjusting the counterbalancing force exerted to said lawn mower.

3. The lawn mower mounting as claimed in claim 2, wherein said connector is a clamp having a bolt securing said clamp in a selected position.

4. The lawn mower mounting as claimed in claim 1, wherein said one of said two mating pieces is a sleeve and said other of said two mating pieces is a shaft disposed within and extending beyond said sleeve, and said lawn mower including an upstanding member, and a pin connecting said shaft and said upstanding member together, and said torsion spring having one end thereof anchored on said pin.

\* \* \* \* \*